Oct. 21, 1924.　　　　　　　　　　　　　　　　　1,512,170
C. H. HAPGOOD
WEIGHING SCALE
Filed Dec. 10, 1919　　　　4 Sheets-Sheet 3

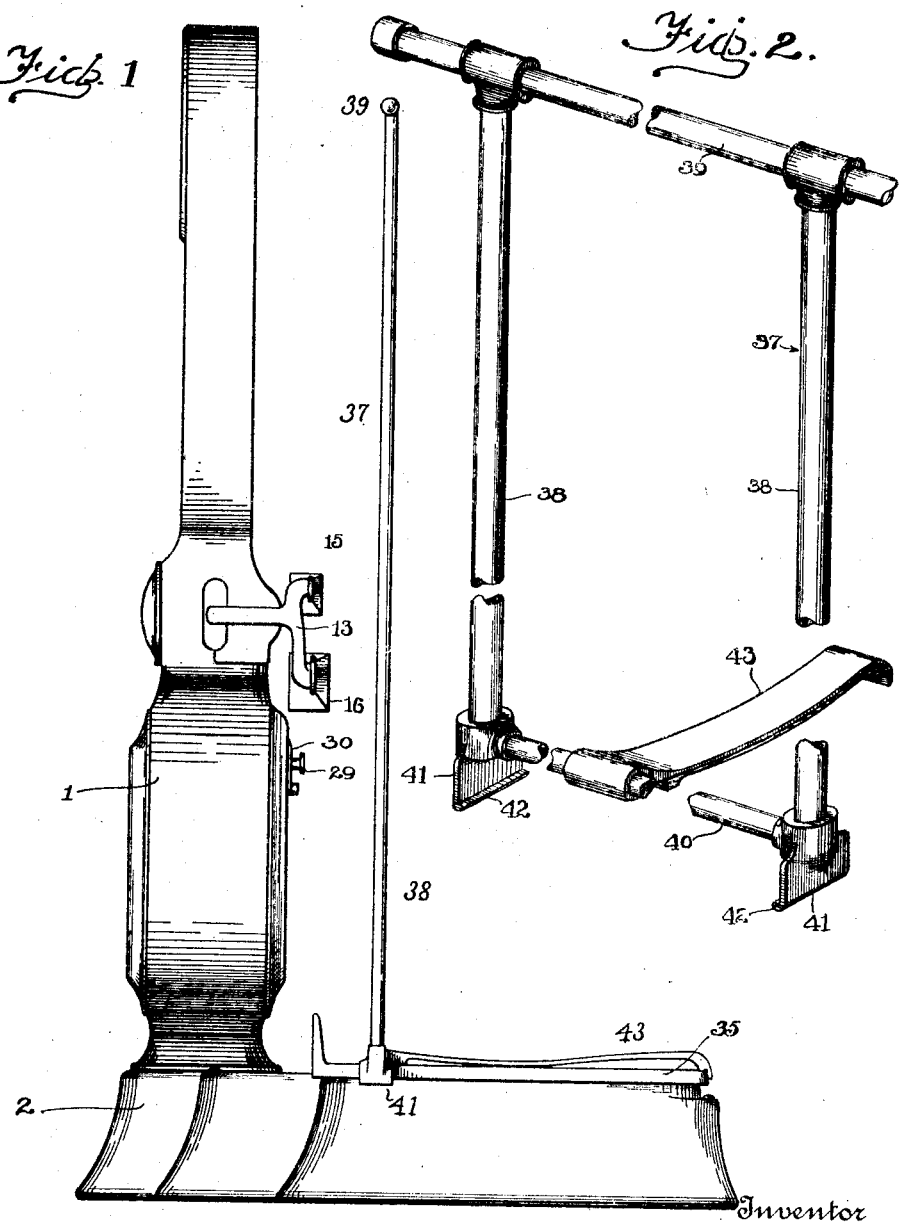

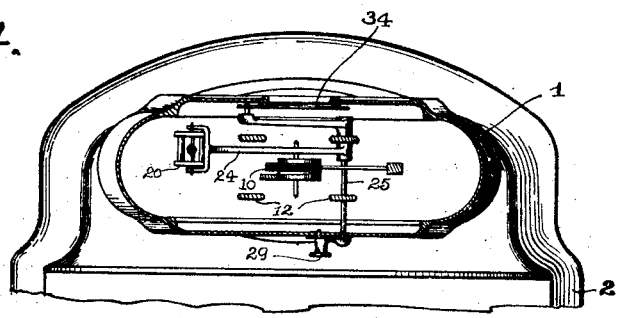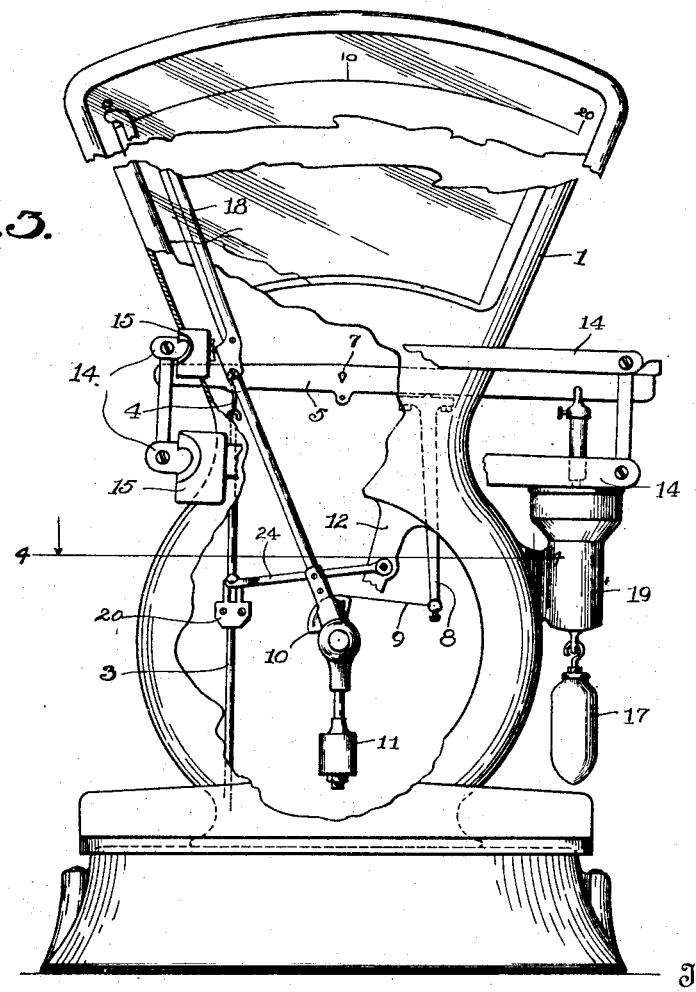

Witness
C. E. Hilcox

Inventor
Clarence H. Hapgood.
By George R. Frye.
Attorney

Oct. 21, 1924.
C. H. HAPGOOD
WEIGHING SCALE
Filed Dec. 10, 1919
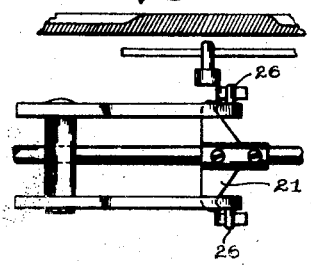
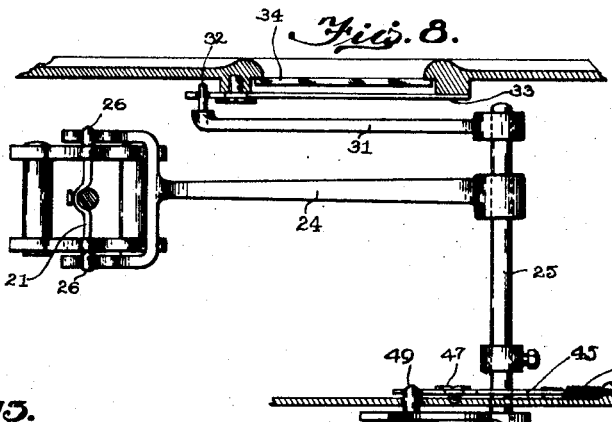
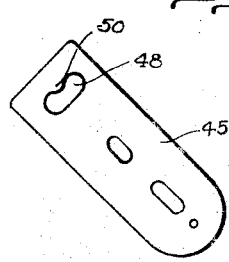
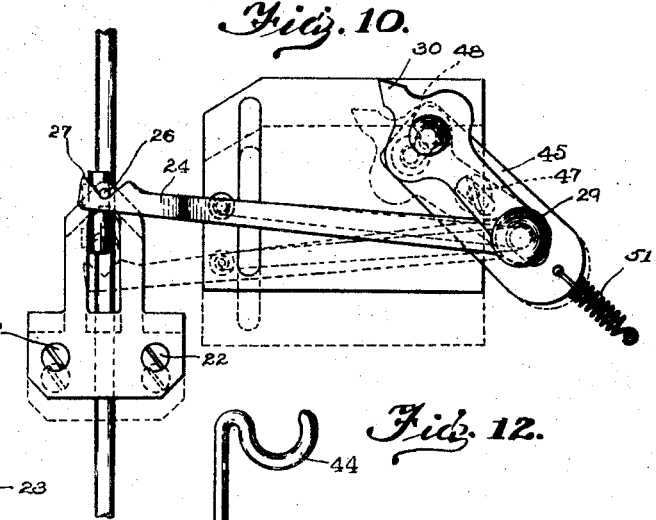
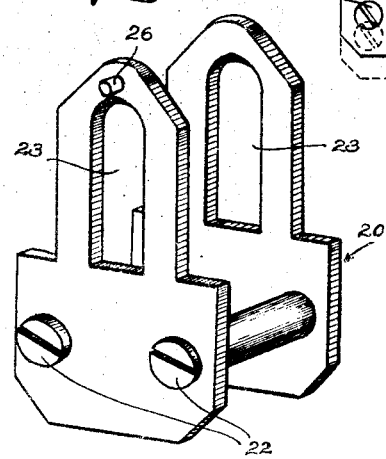
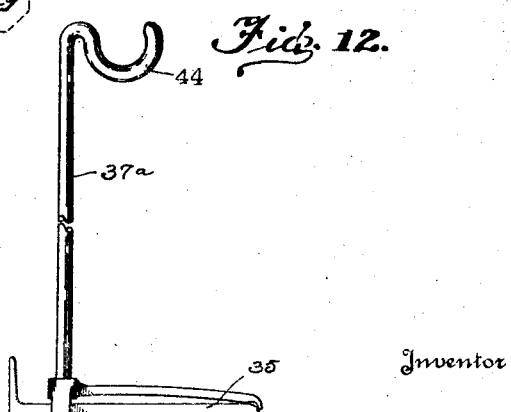
Inventor
Clarence H. Hapgood.
By George R. Frye
Attorney
Witness
C. E. Wilcox Patented Oct. 21, 1924.

1,512,170

UNITED STATES PATENT OFFICE.

CLARENCE H. HAPGOOD, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed December 10, 1919. Serial No. 343,856.

*To all whom it may concern:*

Be it known that I, CLARENCE H. HAPGOOD, a citizen of the United States, residing at Toledo, in the county of Lucas and State of Ohio, have invented certain new and useful Improvements in Weighing Scales, of which the following is a specification.

This invention relates to scales, and particularly to scales provided with auxiliary commodity-receivers to be placed on the platform for weighing commodities which owing to their peculiar sizes and shapes, the platform itself is not adapted to receive.

One of the objects of the invention is the provision of a simple and efficient device for balancing the scale when the auxiliary commodity-receiver is removed from the platform.

Another object is the provision of a prominently displayed indicator to show to both dealer and customer whether the scale is in condition to weigh correctly with the auxiliary commodity-receiver on or off the platform.

Another object is the provision of easily operated mechanism for placing the balancing device upon the scale and removing it therefrom which leaves the weighing mechanism entirely free whether the balancing device be on or off.

Another object is the provision of a device of this character which is entirely enclosed within the scale housing so as to be tamper-proof and not subject to change in weight on account of corrosion or the accumulation of dust.

Another object is the provision of a practical auxiliary commodity-receiver adapted to support, for weighing, articles such as coils of wire, tires, etc., which, owing to their peculiar shapes and sizes, are difficult to weigh upon a platform or scoop of ordinary construction.

In general, it is an object of the invention to provide a scale particularly adapted for use in weighing such commodities as are usually sold in hardware stores.

Other objects and advantages will be apparent from the following description, in which reference is had to the accompanying drawings illustrating preferred embodiments of my invention and in which similar reference numerals designate similar parts throughout the several views.

In the drawings:—

Figure 1 is a side elevation of a scale embodying my invention, with an auxiliary commodity-receiving rack in place on the platform thereof;

Figure 2 is an enlarged perspective view of the auxiliary commodity-receiving rack shown in Figure 1, parts being broken away;

Figure 3 is a front elevation of a part of the scale, with part of the housing broken away to show the weighing mechanism;

Figure 4 is a horizontal section on the line 4—4 of Figure 3;

Figure 8 is a plan view of a device for applying a balancing weight to the steelyard, part of the scale housing being shown in section;

Figure 9 is a side elevation of a part of the device shown in Figure 8, the weight being in position on the steelyard;

Figure 10 is a front elevation of the weight applying device, showing the customer's flash plate and the indicating pointer;

Figure 11 is an enlarged perspective view of the balancing weight;

Figure 12 is an elevational view of another form of commodity-receiving racks; and Figure 13 is a detail view of a spring locking plate.

Figure 5:
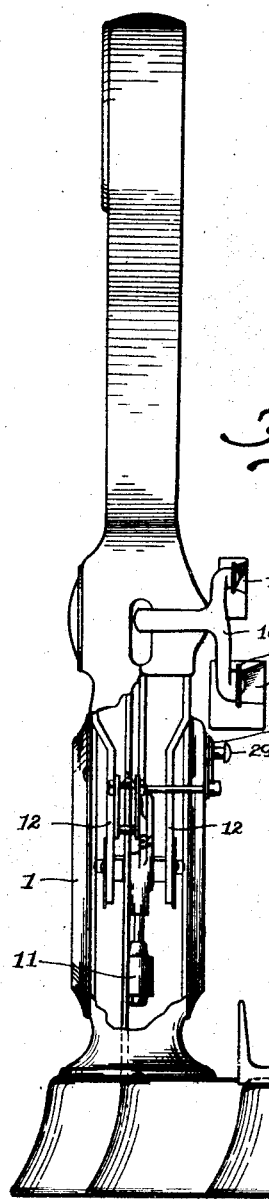
Figure 5 is a side elevation of the scale shown in Figure 1, with a scoop on the platform, part of the scale housing being broken away.
Figure 6:
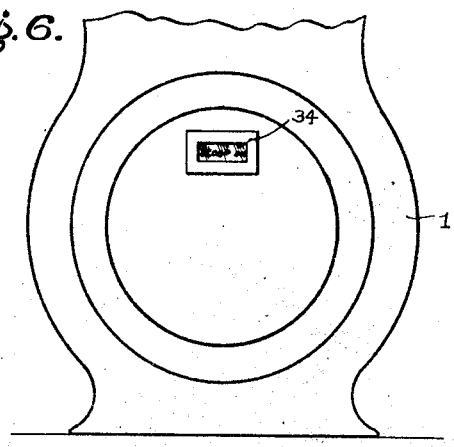
Figure 6 is a rear elevation of a part of the housing, showing a flash indicator on the customer's side.
Figure 7:
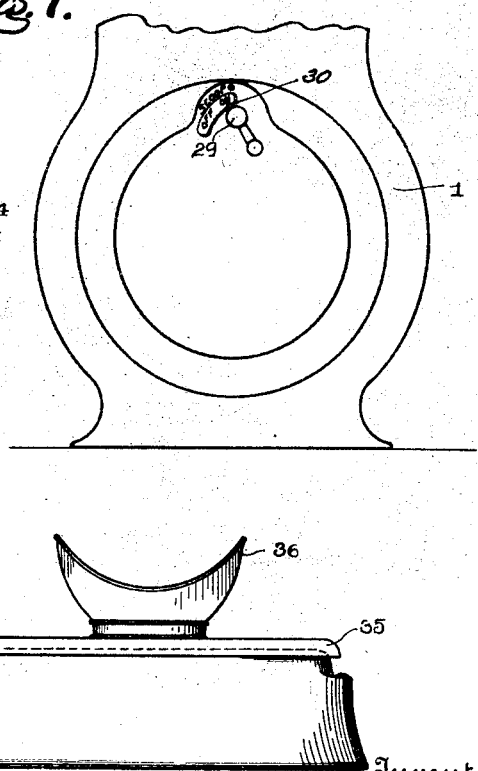
Figure 7 is a front elevation of part of the housing, showing an indicating pointer on the merchant's side.

Referring to the drawings in detail, an upright scale housing 1 of well-known type is supported in position upon a base 2 which contains the usual platform levers (not shown). Extending upwardly from the platform lever mechanism of the scale and forming a connection therefrom to the load-offsetting mechanism is a steelyard rod 3, the upper end of which is formed into a hook which engages a stirrup 4 supported in the usual manner upon bearings carried by the tare beam lever 5. The fulcrum pivots 7 of the tare beam lever 5 are rockably seated in bearings supported within the housing 1. Rigidly secured to the tare beam lever 5 and extending downwardly therefrom is a depending arm 8, the lower end of which moves laterally as the tare beam lever rocks on its pivots, and secured at one end to the lower end of said arm is a flexible steel band or ribbon 9, the other end of which passes over the curved face of a power sector 10 secured in rigid relation to a load-offsetting pendulum 11. The load-offsetting pendulum 11 swings upon pivots carried in bearings in the brackets 12 which extend into the housing 1. Thus, when a load is placed upon the scale and the steelyard rod 3 is pulled downwardly, the lever 5 is rocked upon its pivot and the lower end of the arm 8 caused to move laterally, which creates a pull upon the ribbon 9 and swings the pendulum 11 upwardly and to the left until the load on the scale is balanced.

Rigidly secured to each end of the tare beam lever 5 is a bifurcated arm 13, the arms 13 serving to support tare beams 14 which extend in front of the housing 1 and carry slidable poises 15 adapted to move the said tare beam to offset tare or to increase the capacity of the scale. The capacity of the scale may be further increased by attaching a hanging poise 17 at the end of the tare beam lever 5 which projects from the right side of the housing.

The upper part of the housing 1 is fan-shaped and displays a suitably graduated chart over which an index 18, which is rigidly attached to the pendulum 11, swings to indicate the weight of the load on the scale. Said chart may be arranged to compute the money value of the weights offset by the pendulum. A dash pot 19 is mounted upon the housing and contains a plunger suitably connected to the tare beam lever 5, the dash pot device serving to obsorb shocks and thus protect the load-offsetting mechanism.

An important feature of my invention relates to means for properly balancing the scale when the auxiliary commodity-receiver is removed from the platform. This is accomplished by hanging a balancing weight 20 upon the T-shaped bracket 21 which is secured to the steelyard rod 3. The weight 20 is herein shown as formed with a pair of parallel plates secured in spaced relation by means of shouldered screws 22 (see Figure 11) and each provided with a vertically-extending slot 23. When the weight is in position to balance the scale the upper walls of the slots 23 engage the arms of the T-shaped bracket 21, the weight being thereby suspended upon the steelyard rod in position to swing freely in the plane of movement of the tare beam lever to which the steelyard connects.

The mechanism for lifting the balancing weight from the bracket 21 consists of an arm 24 having one end secured to a rock shaft 25 journaled in the brackets 12. The free end of the arm 24 is bifurcated, as shown in Figure 8, the furcations thereof extending upon each side of the weight 20 and being provided with notches 27 for the reception of a pair of lugs 26 extending laterally from the weight 20 when the arm 24 is swung upwardly. Further movement of the arm 24 will then lift the weight from the steelyard rod. One end of the rock shaft 25 extends through the front wall of the housing 1 and is provided with a handle 29 carrying a pointer 30 which, when the handle is so turned as to deposit the weight 20 upon the bracket 21, points to the words "Scoop off" and when the handle is so turned as to lift the weight from the bracket, points to the words "Scoop on," thereby indicating the condition of the weighing mechanism to the person operating the scale.

In order to releasably hold the counterweight-lifting mechanism in "on" or "off" position, a spring locking plate 45 is slidably mounted in the housing. The plate 45 has a pair of aligned slots which receive the shaft 25 and bolt 47 respectively, and is further provided with a transverse slot 48 which receives a lug 49 extending from the handle 29 through the wall of the housing. The transverse slot 48 is preferably formed in its upper wall with a hump 50 serving to divide the slot into two pockets, thereby preventing the lug 49 and counterweight-lifting mechanism from accidentally moving in the transverse slot. When the handle 29 is grasped and the shaft 25 rocked, the lug 49 is pressed against the hump 50, causing the plate 45 to ride upwardly against the tension of the spring 51, which returns the plate 45 to its original position after the lug has passed to the other pocket of the transverse slot 48.

The rock shaft 25 also carries an arm 31 having a lug 32 at its free end which engages an opening in a flash plate 33 slidably mounted on the inner face of the rear side of the housing 1. As the shaft 25 is turned to swing the arm 24 and thereby remove the weight 20 from the bracket 21 or deposit the same thereon, the arm 31 is swung in the same direction to move the flash plate 33 upwardly or downwardly, thereby displaying the words "Scoop on" or "Scoop off," as the case may be, through the window 34 in the rear wall of the housing 1. Thus an indication is given to the customer whereby he will be informed whether the scale is in condition to weigh with the auxiliary commodity-receiver on or off the platform.

When the weight 20 is in position on the bracket 21 the scale is adapted to weigh ordinary parcels which may be conveniently placed upon the platform 35. In order to adapt the scale to weigh quantities of small articles, such as nails or comminuted substances, it is furnished with a scoop 36 of ordinary construction, and it is when such scoop is placed on the scale platform that the weight 20 is removed from the steelyard.

There are, however, many commodities which by reason of their peculiar sizes and shapes cannot be conveniently supported in position to be weighed by either the platform or the scoop. For the purpose of weighing commodities of this nature I have provided a second auxiliary commodity-receiver in the form of an upstanding rack 37 (see Figures 1 and 2), comprising a pair of uprights 38 connected at their upper and lower ends by crossbars 39 and 40 and having at their lower corners channeled feet 41. The feet 41 are preferably provided at their lower edges with lips or flanges 42 extending inwardly and adapted to engage the lower edge of the platform 35 when the rack tilts slightly, the channel of which the lip 42 forms the lower wall being slightly wider than the platform to enable ready mounting of the rack in position. The rack is placed upon the scale by sliding the channeled feet 41 over the sides of the platform from the front of the scale, its correct position being determined by a limited bar 43 having one end pivoted upon the lower crossbar 40 and its other end turned downwardly to engage the edge of the platform 35. Preferably the bar 43 is cupped (see Figure 1) to provide a seat for coils of wire, etc. When it is desired to weigh an article that cannot conveniently be placed on the platform, as, for example, an automobile tire, the rack is positioned upon the platform substantially as shown in Figure 1, and the tire is placed upon the rack with the tread thereof resting upon the concave retaining plate 43, the side of the tire leaning against the uprights 38 or the upper crossbar 39.

In Figure 12 I have shown another form of rack 37ª which is provided at its upper end with a hook 44 upon which articles not adapted to stand upon the platform may be suspended. This rack is otherwise quite similar to the preferred form shown in Figures 1 and 2.

The commodity-supporting racks are preferably of the same weight as the scoop hereinbefore referred to, and have the same offsetting effect on the weighing mechanism as the weight 20 in its position on the steelyard rod. Thus, the removal of the weight 20 from the steelyard rod in the manner described permits the weight of the rack to act directly on the weighing mechanism of the scale and serves to bring the indicator hand into registry with the zero position on the chart.

While it will be apparent that the illustrated embodiments of my invention herein disclosed are well calculated to adequately fulfill the objects primarily stated, it is to be understood that the invention is susceptible to variation, modification and change within the spirit and scope of the subjoined claims.

Having described my invention, I claim:

1. In a scale provided with an auxiliary commodity-receiver, in combination, weighing mechanism, including a steelyard rod, a weight supported solely and freely by said steelyard rod, and means to shift said weight off and on said steelyard whereby said weight may be substituted for the weight of the auxiliary commodity-receiver in bringing the scale to balance.

2. In a scale, in combination, weighing mechanism, including a steelyard rod, a bracket on said steelyard rod, a weight hanging from said bracket, and means to remove and replace said weight whereby said weight may be substituted for the weight of an auxiliary commodity-receiver in bringing the scale to balance.

3. In a scale, in combination, a housing, weighing mechanism therein, including a steelyard rod, a weight support on said steelyard rod, a weight adapted to be placed upon said support, means to shift said weight onto and off of said support, said weight-shifting means being enclosed in said housing, and a handle connected to said weight-shifting means and located outside said housing.

4. In a scale, in combination, a housing, weighing mechanism therein, including a steelyard rod, a weight support on said steelyard rod, a weight adapted to be placed upon said support, means to shift said weight onto and off of said support, said weight-shifting means being enclosed in said housing, a handle connected to said weight-shifting means and located outside said housing, and means connected to said weight-shifting means to indicate whether or not said weight is on said support, said indicating means including a signal displayed through said housing.

5. In a scale, in combination, a housing, weighing mechanism therein, including a steelyard rod, a weight support on said steelyard rod, a weight adapted to be placed upon said support, means to shift said weight onto and off of said support, said weight-shifting means being enclosed in said housing, a handle connected to said weight-shifting means and located outside said housing, means connected to said weight-shifting means to indicate whether or not said weight is on said support, said indicating means including a signal displayed through said housing, and a pointer carried by said handle.

6. In a scale, in combination, a housing, weighing mechanism therein, a counterweight adapted to be placed on said weighing mechanism, means to shift said weight onto and off of said weighing mechanism, said weight-shifting means comprising a rock shaft, an arm projecting therefrom and engageable with said weight, a second arm projecting from said rock shaft, and a signal operated by said second arm and displayed through said housing.

7. In a scale, in combination, a housing, weighing mechanism therein, a counterweight adapted to be placed on said weighing mechanism, means to shift said weight onto and off of said weighing mechanism, said weight-shifting means comprising a rock shaft, an arm projecting therefrom and engageable with said weight, a second arm projecting from said rock shaft, a signal operated by said second arm and displayed through said housing, an operating handle for said shaft, and an indicator connected to said handle.

8. In a scale provided with an auxiliary commodity-receiver weighing mechanism, including a steelyard, arms projecting laterally therefrom, a counterweight having elongated slots receiving said arms, means for suspending said weight so that said arms may move during weighing operations in said slots without contact therewith, and means for lowering said suspending means to cause the upper ends of said slots to engage said arms.

9. In a scale, in combination, a platform, weighing mechanism co-operating therewith, a scoop adapted to be placed upon said platform, a counterweight adapted to be placed upon said weighing mechanism to balance the scale when the scoop is removed, and a commodity-receiving rack of the same weight as said scoop adapted to be substituted therefor.

CLARENCE H. HAPGOOD.

Witnesses:
C. O. MARSHALL,
C. E. WILCOX.